(12) United States Patent
Lee et al.

(10) Patent No.: US 8,619,259 B2
(45) Date of Patent: Dec. 31, 2013

(54) HIGH-SPEED OPTICAL MEASUREMENT APPARATUS

(75) Inventors: Seong Weon Lee, Suwon (KR); Sang Young Chin, Incheon (KR); Gyung Su Moon, Suwon (KR)

(73) Assignee: ENC Technology Co., Ltd., Suwon (KR)

( * ) Notice: Subject to any disclaimer, the term of this patent is extended or adjusted under 35 U.S.C. 154(b) by 215 days.

(21) Appl. No.: 13/153,442

(22) Filed: Jun. 5, 2011

(65) Prior Publication Data

US 2011/0299087 A1 Dec. 8, 2011

(30) Foreign Application Priority Data

Jun. 8, 2010 (KR) .................. 10-2010-0053827

(51) Int. Cl.
*G01N 21/55* (2006.01)
(52) U.S. Cl.
USPC .......................................... 356/445
(58) Field of Classification Search
None
See application file for complete search history.

(56) References Cited

U.S. PATENT DOCUMENTS

2010/0245811 A1* 9/2010 Yoshikawa ................ 356/237.2

FOREIGN PATENT DOCUMENTS

JP 2010117149 A * 5/2010

* cited by examiner

*Primary Examiner* — Gregory J Toatley
*Assistant Examiner* — Amanda Merlino
(74) *Attorney, Agent, or Firm* — LRK Patent Law Firm

(57) ABSTRACT

A high-speed optical measurement apparatus includes an objective lens unit, an optical path unit, a control circuit unit, a measurement sensor, an eyepiece unit, and a measurement sensor connection. The objective lens unit adjusts the magnitude of the overall light of the individual locations of the object or the set of multiple objects, and allows the light to make its entrance. The optical path unit changes the path of the incident light. The control circuit unit outputs a control signal which is used to change a direction of the light by controlling the optical path unit. The measurement sensor measures the incident light. The eyepiece unit conforms the light to the size and location of the measurement sensor. The measurement sensor connection fastens the measurement sensor so that the light incoming through the eyepiece unit is aligned with the measurement sensor.

5 Claims, 5 Drawing Sheets

HIGH-SPEED OPTICAL MEASUREMENT APPARATUS

CROSS REFERENCE TO RELATED APPLICATION

This application claims the benefit under 35 U.S.C. 119(a) of Korean Patent Application No. 10-2010-0053827, filed on Jun. 8, 2010, the disclosure of which is incorporated by reference in its entirety for all purposes.

BACKGROUND OF THE INVENTION

1. Field of the Invention

The present invention relates generally to a high-speed optical measurement apparatus, and, more particularly, to an apparatus that can measure the optical characteristics of the multiple measurement locations of an object or a set of multiple objects at high speed using the reflection of light by a mirror or an array of multiple MicroElectroMechanical Systems (MEMS) mirrors, that is, a Digital Micromirror Device (DMD), which is coupled with a drive unit.

2. Description of the Related Art

As technology is developing, rapid changes are taking place in display devices, such as an increase in the size of the screens of monitors and televisions and the use of the sets of large numbers of light emitting elements in Light-Emitting Diode (LED) bulletin boards, traffic signals and automobile lamps. In order to measure and manage the quality of such products, there is a need to measure the optical characteristics of the individual measurement locations of an object or the individual objects of a set of multiple objects.

For this reason, a conventional measurement method is configured so that a measurement sensor is located on a multiaxially movable mechanical structure, the measurement sensor is sequentially moved to the multiple measurement locations of an object at fixed locations, and then individual measurements are taken, or an object is fastened to a multiaxially movable mechanical structure, the object is moved so that the multiple measurement locations of the object are sequentially located at the location of the fastened measurement sensor, and then a measurement is taken. Accordingly, there is a limit to the measurement of the optical characteristics of the measurement locations of the object at high speed.

FIG. 1 is a diagram showing an example of an apparatus for measuring optical characteristics using a conventional method. As shown in FIG. 1, optical measurements are taken in such a way that a measurement sensor B is placed at location A of a multiaxially movable mechanical structure and the measurement sensor B is sequentially moved to the measurement locations $P_1$, $P_2$, ..., and $P_N$ of an object at intervals L by controlling drive units $X_M$ and $Y_M$ for respective driving axes X and Y.

In this case, the measurement sensor B should be moved to the measurement locations at intervals L 'N' times, so that measurement time increases in proportion to the number of measurement locations of an object or the number of objects of a set of objects, which is the cause of the increase in the manufacturing cost of products. Meanwhile, when a plurality of mechanical structures each of which is shown in FIG. 1 is installed in order to reduce the measurement time that increases in proportion to the number of measurement locations of an object or the number of objects of a set of objects, the manufacturing cost of products will be increased.

As a result, in order to overcome the above-described problem, there is a need for an apparatus and method that is capable of placing the multiple measurement locations of an object or a set of multiple objects and one or more measurement sensors at respective designated locations and selectively measuring the individual measurement locations of the object or the individual objects of the set of multiple objects without increasing the cost.

SUMMARY OF THE INVENTION

Accordingly, the present invention has been made keeping in mind the above problems occurring in the prior art, and an object of the present invention is to provide a high-speed optical measurement apparatus that reflects the light of an object or a set of multiple objects towards a mirror coupled with a drive unit and changes the direction in which light propagates by controlling the mirror based on the displacement of a central angle f that is significantly smaller than planar distances $L_x$ and $L_y$, so that the individual measurement locations of the object or the individual objects of the set of multiple objects are sequentially selected and then the optical characteristics thereof are measured at high speed.

Another object of the present invention is to provide a high-speed optical measurement apparatus that reflects the overall light of an object or a set of multiple objects towards an array of multiple MicroElectroMechanical Systems (MEMS) mirrors, that is, a Digital Micromirror Device (DMD), and selectively controls the micromirrors of the DMD that are reached by the individual measurement locations of the object or the individual objects of the set of multiple objects, so that high-speed optical measurement is enabled even when the number of individual measurement locations of the object or the number of individual objects of the set of multiple objects is considerably large or the intervals between them are considerably narrow.

In order to accomplish one object, the present invention provides a high-speed optical measurement apparatus for measuring the optical characteristics of the individual measurement locations of an object or the individual objects of a set of multiple objects at high speed, including an objective lens unit for adjusting the magnitude of the overall light of the individual locations of the object or the set of multiple objects and allowing the light to make its entrance; an optical path unit for changing the path of the light incident from the objective lens unit; a control circuit unit for outputting a control signal which is used to change the direction in which the light propagates by controlling the optical path unit; a measurement sensor for measuring the incident light; an eyepiece unit for conforming the light, the direction of which has been changed by the optical path unit, to a size and location of the measurement sensor; and a measurement sensor connection for fastening the measurement sensor so that the light incoming through the eyepiece unit is aligned with the measurement sensor.

The optical path unit may include a mirror configured such that the light incident from the objective lens unit reaches it; and a drive unit configured to change the direction in which the light propagates by controlling the mirror.

The mirror may be formed of MicroElectroMechanical Systems (MEMS) mirrors.

In order to accomplish another object, the present invention provides a high-speed optical measurement apparatus for measuring optical characteristics of individual measurement locations of an object or individual objects of a set of multiple objects at high speed, including an objective lens unit for adjusting a magnitude of overall light of the individual locations of the object or the set of multiple objects and allowing the light to make its entrance; an optical path unit for changing a path of the light incident from the objective lens unit; a control circuit unit for outputting a control signal which is used to change a direction in which the light propagates by controlling the optical path unit; a first measurement sensor for measuring the incident light; a first eyepiece unit for conforming the light, which is made to be incident upon an array of multiple MEMS mirrors, that is, a Digital Micrometer Device (DMD), by the objective lens unit and the direction of which has been changed by the DMD in synchronization with a first control signal output from the control circuit unit, to a size and location of the first measurement sensor; a second measurement sensor for measuring the incident light; a second eyepiece unit for conforming the light, the direction of which has been changed by the DMD in synchronization with a second control signal, to a size and location of the second measurement sensor; and measurement sensor connections for fastening the measurement sensors so that the light incoming through each of the eyepiece units is aligned with a corresponding measurement sensor; wherein the control circuit unit sequentially controls mirrors corresponding to respective light emitting elements.

One or more of the first and second measurement sensors may be image sensors capable of acquiring images, and control the mirrors corresponding to the individual measurement locations of the object or the individual objects of the set of multiple objects under one or more of search conditions, that is, a size, arrangement, color and number of objects.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
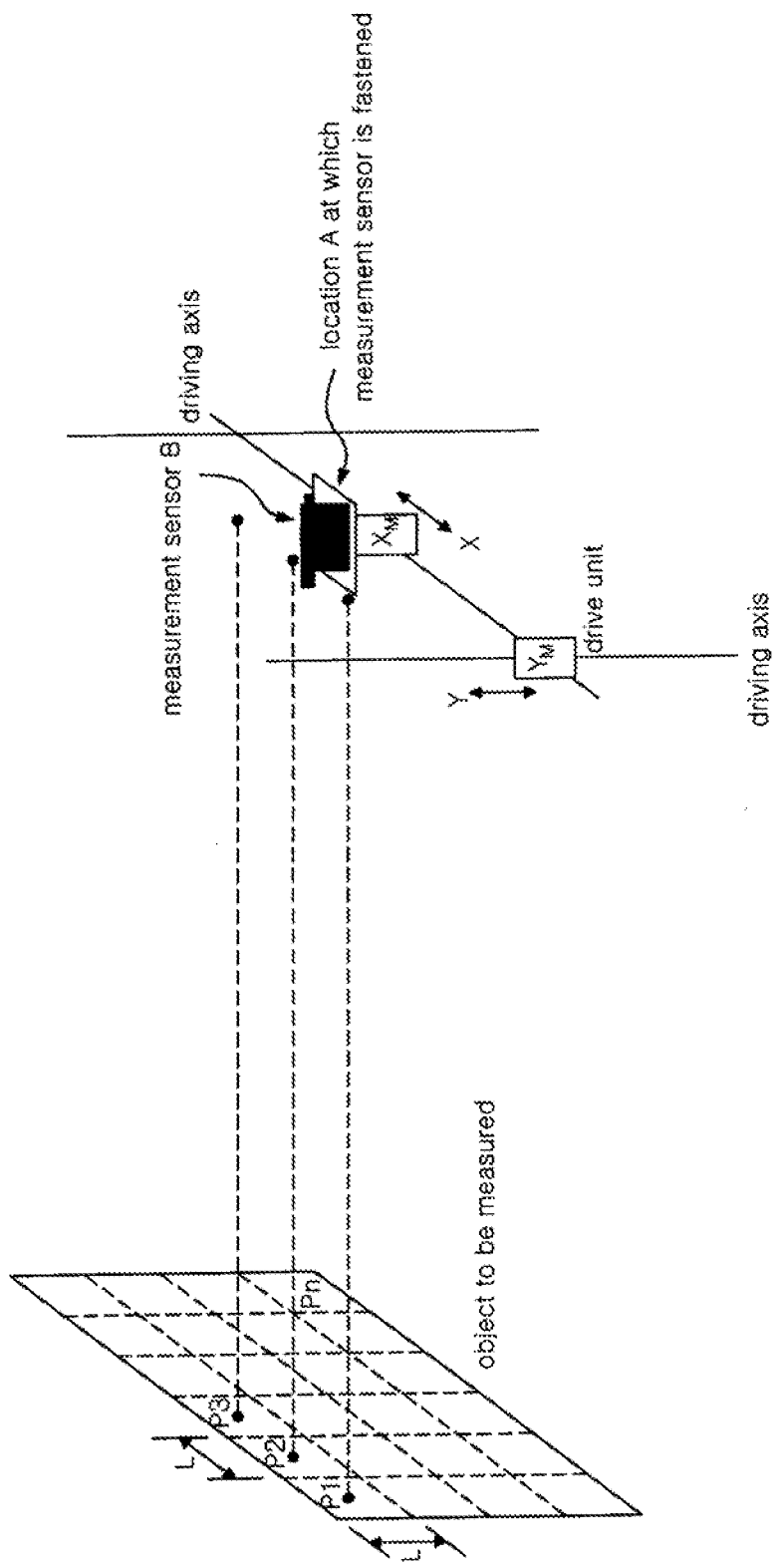
FIG. 1 is a diagram showing a conventional method of measuring the optical characteristics of the multiple locations of the object or a set of multiple objects.

Reference now should be made to the drawings, in which the same reference numerals are used throughout the different drawings to designate the same or similar components.

An embodiment of the present invention will be described in detail below with reference to the accompanying drawings.

Figure 2:
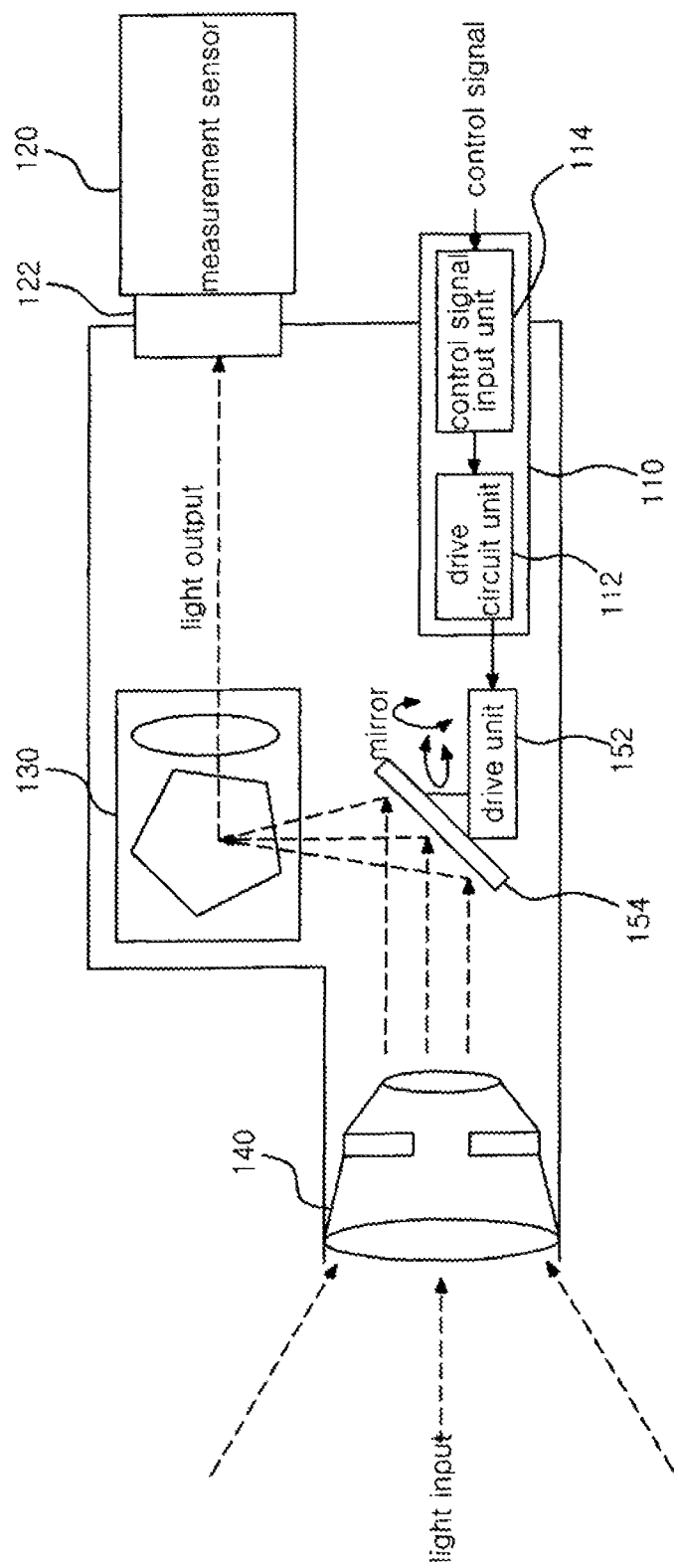
FIG. 2 is a drawing showing the configuration of a high-speed optical measurement apparatus according to the present invention.
Figure 3:
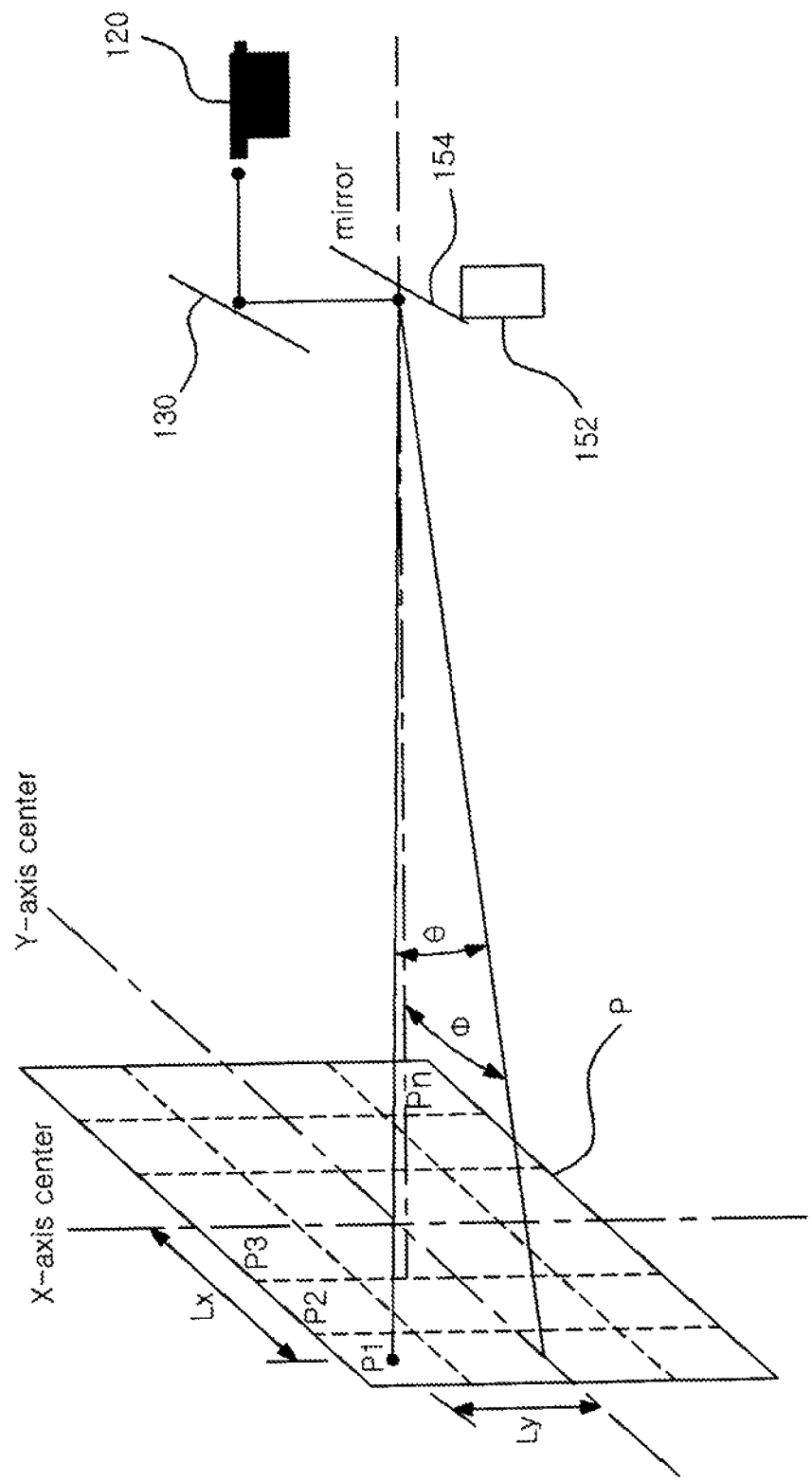
FIG. 3 is a drawing showing a high-speed optical measuring method according to the present invention.

FIG. 2 is a drawing showing the configuration of a high-speed optical measurement apparatus 100 according to the present invention, and FIG. 3 is a drawing showing a high-speed optical measuring method according to the present invention. As shown in FIGS. 2 and 3, the high-speed optical measurement apparatus 100 according to the present invention includes an objective lens unit 140, an eyepiece unit 130, a measurement sensor 120, a control circuit unit 110, and an optical path unit 150.

The objective lens unit 140 is configured to adjust the magnitude of the light of an object having multiple measurement locations or a set of multiple objects, and to allow the light, the magnitude of which has been adjusted, to make its entrance.

The control circuit unit 110 converts the plane measurement locations $P_1$, $P_2$, ..., and $P_N$ of an object incoming through the objective lens unit 140 into respective rotating angles f of the mirror 154, and outputs control signals.

Each of the rotating angles f may be converted into a horizontal angle $\Phi$ and a vertical angle $\theta$ based on the centers of an object in the X and Y axes.

In detail, it is possible to sequentially select the individual measurement locations of an object or the individual objects of a set of multiple objects and measure the optical characteristics thereof at high speed in such a way as to change the direction in which light propagates by controlling the mirror 154 based on the displacement of central angle f which is considerably smaller than planar distances $L_x$ and $L_y$.

The optical path unit 150 is configured to change the direction in which light propagates by controlling light incident from the objective lens unit 140.

For this purpose, the optical path unit 150 includes a mirror 154 configured such that light reaches it and a drive unit 152 configured to change the direction in which light propagates by controlling the mirror 154.

That is, the optical path unit 150 includes the drive unit 152 configured to operate in synchronization with control signals output from the control circuit unit 110 and the mirror 154 coupled with the drive unit 152 and configured to rotate at rotating angle f.

The drive unit 152 is configured to change the direction in which light propagates by controlling the mirror 154 based on the displacement of a central angle f which is considerably smaller than planar distances $L_x$ and $L_y$.

In detail, the light corresponding to the overall size L×H of the object is incident upon the mirror of size l×h. When the sensor is apart from the center of the mirror by distance d, the relationship between planar distances $L_x$ and $L_y$, horizontal angle $\Phi$ and vertical angle $\theta$ is expressed by the following Equation 1:

$$\cos(\phi) = \frac{1/2 - L_x \times (1/L)}{d}, \qquad (1)$$
$$\cos(\theta) = \frac{h/2 - L_y \times (h/H)}{d}$$

The mirror may be formed of a MicroElectroMechanical Systems (MEMS) mirror.

MEMS relates to micro-technology. The term "MEMS" refers to a device in which mechanical parts, sensors, actuators and electronic circuits have been integrated in a single silicon substrate. The device is operated using actuators. Since MEMS are well known, a detailed description thereof will be omitted here.

The eyepiece unit 130 is configured to conform the light, the direction of which has been changed by the optical path unit 150, to the size and location of the measurement sensor 120.

That is, the eyepiece unit 130 converts the light of the object, the direction of which has been changed by the mirror 154 coupled with the drive unit 152, into light of the size appropriate for the measurement sensor 120, and causes the light of the appropriate size to be incident at the location of the measurement sensor 120.

For this purpose, a measurement sensor connection 122 for fastening the measurement sensor 120 is provided such that the light of the object can accurately reach the location of the measurement sensor 120 through the eyepiece unit 130.

The measurement sensor 120 is configured to measure the optical characteristics of each of the multiple measurement locations of an object or a set of multiple objects in order to measure and manage quality.

The objective lens unit 140 and the eyepiece unit 130 should perform uniform reflection, absorption and transmission for each wavelength of light in order to ensure the accurate optical measurement of an object.

Furthermore, the objective lens unit 140 may be configured to be equipped with a filter that is capable of selectively transmitting only light in a partial wavelength range.

Figure 4:
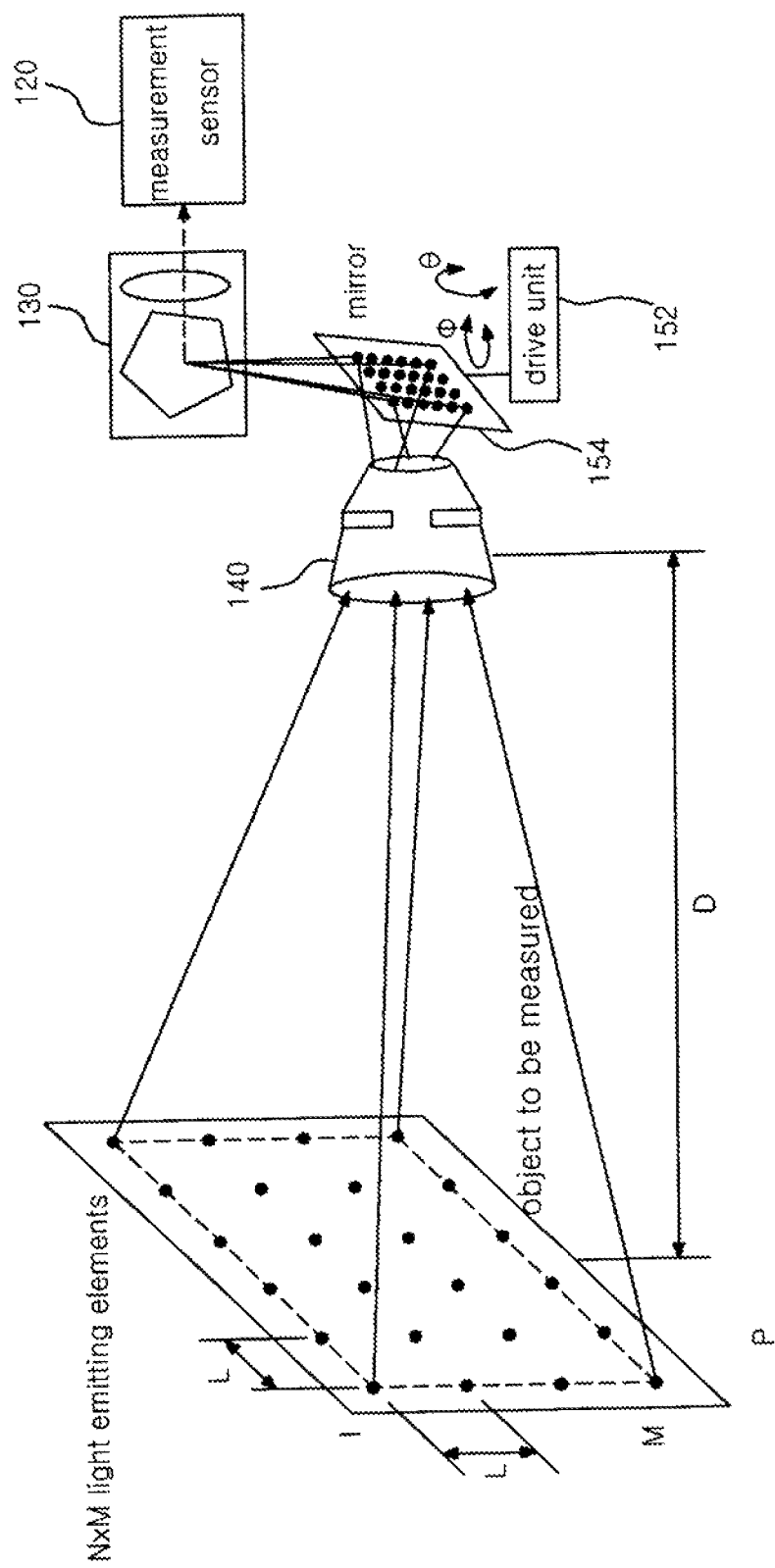
FIG. 4 is a drawing showing an embodiment of the high-speed optical measurement apparatus according to the present invention.

FIG. 4 is a drawing showing an embodiment of the apparatus for measuring the optical characteristics of the multiple locations of an object or a set of multiple objects according to the present invention. As shown in this drawing, N light emitting elements are arranged at intervals L in each of M rows, the overall light of the light emitting elements is adjusted to a size that allows the light to pass through an eyepiece unit 130 and then reach a measurement sensor by a objective lens unit 140 across a distance D, is incident upon a mirror 154, and then only the light of a specific light emitting element reaches the measurement sensor 120 via the eyepiece unit 130 as the mirror 154 is rotated at rotating angle f in synchronization with a control signal output from the control circuit unit 110.

Another embodiment of the present invention will be described with reference to FIG. 5.

Figure 5:
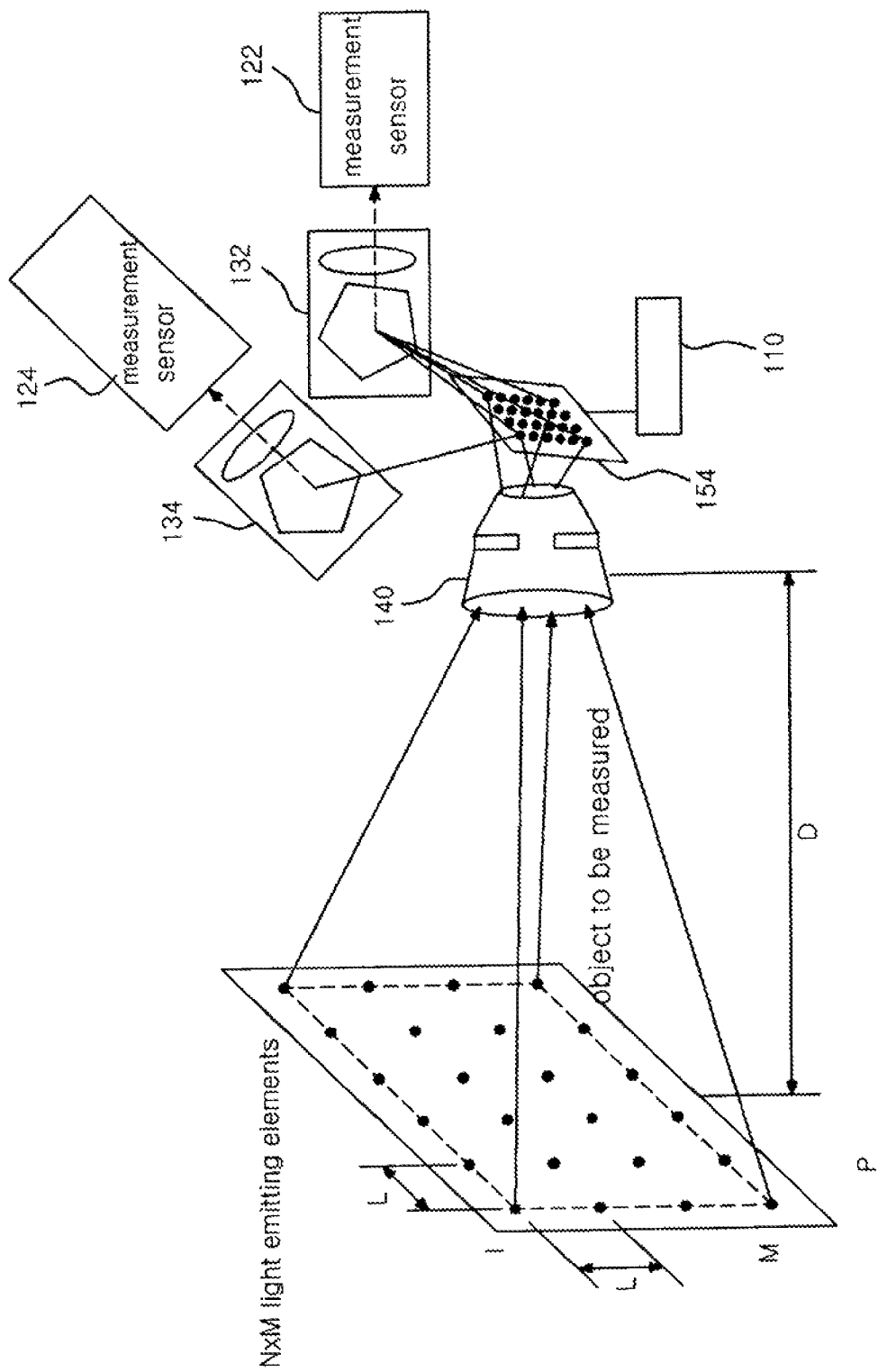
FIG. 5 is a diagram showing an embodiment in which two or more optical measurement sensors are used in the high-speed optical measurement apparatus according to the present invention.

FIG. 5 shows an embodiment in which two or more measurement sensors have been used in an apparatus for measuring the optical characteristics of the multiple locations of an object or a set of multiple objects at high speed according to the present invention. Referring to this drawing, pluralities of eyepiece lenses and measurement sensors are provided in a plurality of directions in which light propagates and which can be controlled by a mirror or an array of multiple MEMS mirrors, that is, a DMD, coupled with a drive unit 152, thereby enabling high-speed optical measurement.

In detail, N light emitting elements are arranged at intervals L in each of M rows, the light of an object is caused to be incident upon an array of multiple MEMS mirrors, that is, a DMD 154, by an objective lens unit 140 across a distance D, the light incident upon the DMD passes through a first eyepiece unit 132 located in the direction of the light determined by the DMD 154 synchronized with a first control signal output from the control circuit unit 110 and then reaches a first measurement sensor 122 for measuring the characteristics of the light incident from the first eyepiece unit 132, the locations of N×M light emitting elements on the DMD 154 are detected, the light passes through a second eyepiece unit 134 in the direction of the light changed by one or more micromirrors of the DMD 154 that are reached by the light of one or more specific light emitting elements at detected locations in synchronization with a second control signal from the circuit unit 110 and reaches a second measurement sensor 124 for measuring the characteristics of the light incident from the second eyepiece unit 134, and high-speed optical measurement can be performed by sequentially controlling mirrors corresponding to respective light emitting elements.

One or more of the first and second measurement sensors 122 and 124 may be formed of image sensors. The measurement sensors control mirrors corresponding to the individual measurement locations of the object or the individual objects of the set of multiple objects under one or more of search conditions, that is, the size, arrangement, color and number of objects.

As described above, according to the present invention, optical measurement time can be reduced using the fast operating speed of an array of multiple MEMS mirrors, that is, a DMD, objects at fixed locations and an optical measurement sensor, thereby minimizing the increase in inspection expenses resulting from the increasing areas of display devices and sets of increasing numbers of objects.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high-speed optical measurement apparatus for measuring optical characteristics of individual measurement locations of an object or individual objects of a set of multiple objects at high speed, comprising:
    an objective lens unit for adjusting a magnitude of overall light of the individual locations of the object or the set of multiple objects and allowing the light to make its entrance;
    an optical path unit for changing a path of the light incident from the objective lens unit;
    a control circuit unit for outputting a control signal which is used to change a direction in which the light propagates by controlling the optical path unit;
    a measurement sensor for measuring the incident light;
    an eyepiece unit for conforming the light, the direction of which has been changed by the optical path unit, to a size and location of the measurement sensor; and
    a measurement sensor connection for fastening the measurement sensor so that the light incoming through the eyepiece unit is aligned with the measurement sensor,
    wherein the control circuit unit is configured to sequentially control mirrors corresponding to light corresponding to the individual measurement locations of the object or the individual objects of the set of multiple objects so that the light corresponding to the individual measurement locations of the object or the individual objects of the set of multiple objects may be concentrated on the measurement sensor.

2. The high-speed optical measurement apparatus as set forth in claim 1, wherein the optical path unit comprises:
    a mirror configured such that the light incident from the objective lens unit reaches it; and
    a drive unit configured to change the direction in which the light propagates by controlling the mirror.

3. The high-speed optical measurement apparatus as set forth in claim 2, wherein the mirror is formed of MicroElectroMechanical Systems (MEMS) mirrors.

4. A high-speed optical measurement apparatus for measuring optical characteristics of individual measurement locations of an object or individual objects of a set of multiple objects at high speed, comprising:
    an objective lens unit for adjusting a magnitude of overall light of the individual locations of the object or the set of multiple objects and allowing the light to make its entrance;
    an optical path unit for changing a path of the light incident from the objective lens unit;
    a control circuit unit for outputting a control signal which is used to change a direction in which the light propagates by controlling the optical path unit;

a first measurement sensor for measuring the incident light;

a first eyepiece unit for conforming the light, which is made to be incident upon an array of multiple MEMS mirrors, that is, a Digital Micrometer Device (DMD), by the objective lens unit and the direction of which has been changed by the DMD in synchronization with a first control signal output from the control circuit unit, to a size and location of the first measurement sensor;

a second measurement sensor for measuring the incident light;

a second eyepiece unit for conforming the light, the direction of which has been changed by the DMD in synchronization with a second control signal, to a size and location of the second measurement sensor; and measurement sensor connections for fastening the measurement sensors so that the light incoming through each of the eyepiece units is aligned with a corresponding measurement sensor;

wherein the control circuit unit sequentially controls mirrors corresponding to light corresponding to the individual measurement locations of the object or the individual objects of the set of multiple objects so that the light corresponding to the individual measurement locations of the object or the individual objects of the set of multiple objects may be concentrated on the first measurement sensor.

5. The high-speed optical measurement apparatus as set forth in claim 4, wherein the second measurement sensor is an image sensor capable of acquiring images of the individual measurement locations of the object or the set of multiple objects, and controls light from the mirrors corresponding to the individual measurement locations of the object or the individual objects of the set of multiple objects under one or more of search conditions, that is, a size, arrangement, color and number of objects to be incident upon the first measurement sensor with reference to the measurement results of the second measurement sensor.

* * * * *